United States Patent
Büttner et al.

(10) Patent No.: US 11,778,073 B2
(45) Date of Patent: Oct. 3, 2023

(54) PROTOCOL CONVERTER AND AUTOMATION SYSTEM

(71) Applicant: Beckhoff Automation GmbH, Verl (DE)

(72) Inventors: Holger Büttner, Berlin (DE); Jens Sachs, Petershagen (DE); Robert Zutz, Verl (DE); Daniel Schlotthauer, Berlin (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/968,474

(22) Filed: Oct. 18, 2022

(65) Prior Publication Data

US 2023/0039256 A1 Feb. 9, 2023

Related U.S. Application Data

(63) Continuation of application No. PCT/EP2021/063320, filed on May 19, 2021.

(30) Foreign Application Priority Data

May 19, 2020 (DE) .................. 10 2020 113 572.6

(51) Int. Cl.
*H04L 69/08* (2022.01)
*H04L 12/40* (2006.01)

(52) U.S. Cl.
CPC ........ *H04L 69/08* (2013.01); *H04L 12/40189* (2013.01)

(58) Field of Classification Search
None
See application file for complete search history.

(56) References Cited

U.S. PATENT DOCUMENTS 6,532,508 B2 3/2003 Heckel et al.
7,809,449 B2 10/2010 Esch et al.
(Continued)

FOREIGN PATENT DOCUMENTS

CN 102170430 A 8/2011
DE 19928517 A1 1/2001
(Continued)

OTHER PUBLICATIONS

"EtherCAT—The Ethernet Fieldbus," EtherCAT Technology Group, Mar. 2020, 25 pages.
(Continued)

*Primary Examiner* — Walter J Divito
(74) *Attorney, Agent, or Firm* — Dorsey & Whitney LLP (57) ABSTRACT

In an automation system, a protocol converter is provided between a first network and a second network for converting safety-related messages between the first and second networks that use different network protocols for message exchange. In the protocol converter, a single-channel filter connected to a single-channel interface determines messages having a first safety communication protocol from messages received from the interface over the first network and messages having a second safety communication protocol received over the second network. An at least dual-channel safety module connected to the single-channel filter then converts the messages with the first safety communication protocol determined by the single-channel filter into messages with the second safety communication protocol, or converts the messages with the second safety communication protocol determined by the single-channel filter into messages with the first safety communication protocol.

19 Claims, 6 Drawing Sheets

(56) References Cited

U.S. PATENT DOCUMENTS

| | | | |
|---|---|---|---|
| 11,016,463 B2 | 5/2021 | Hellmann et al. | |
| 2006/0229737 A1 | 10/2006 | Esch et al. | |
| 2006/0271709 A1* | 11/2006 | Vasko | H04L 69/08 709/249 |
| 2016/0173652 A1* | 6/2016 | Chai | H04L 69/08 709/230 |

FOREIGN PATENT DOCUMENTS

| | | |
|---|---|---|
| DE | 102005010820 A1 | 9/2006 |
| DE | 102014110017 A1 | 1/2016 |
| EP | 1701270 A1 | 9/2006 |

OTHER PUBLICATIONS

Office Action dated Apr. 30, 2021 in connection with German patent application No. 102020113572.6, 13 pages including English translation.

Profibus "PROFIsafe system description technology and application," Jun. 4, 2016, 56 pages including English translation.

International Search Report and Written Opinion dated Oct. 1, 2021 in connection with International Patent Application No. PCT/EP2021/063320, 16 pages including English translation.

Office Action dated Mar. 10, 2023 in connection with European patent application No. 21727456.2, 12 pages including English translation.

Office Action dated Jun. 1, 2023 in connection with Chinese patent application No. 202180034245.4, 12 pages including English translation.

\* cited by examiner

PROTOCOL CONVERTER AND AUTOMATION SYSTEM

CROSS-REFERENCE TO RELATED APPLICATIONS

The present patent application is a continuation of International Patent Application PCT/EP2021/063320, "Protocol Converter and Automation System" filed May 19, 2021, which claims the priority of German Patent Application DE 10 2020 113 572.6, "Protokollumsetzer and Automatisierungs system," filed May 19, 2020, the disclosure content of each of which is hereby incorporated by reference herein, in the entirety and for all purposes.

FIELD

The present invention relates to a protocol converter and an automation system comprising such a protocol converter.

BACKGROUND

Modern concepts of industrial automation, i.e. controlling and monitoring technical processes by software, are based on the idea of a central control with a simultaneously distributed sensor/actuator level. A bus system, referred to in the following as a field-bus system, connects the field devices such as sensors and actuators to an automation device.

So that the subscribers on the field bus may send their messages over the same line, a standardized protocol is used for message transmission between the subscribers, referred to in the following as field-bus protocol, which specifies who (identifier) outputs what (measured value, command) on the field bus and when (initiative).

Nowadays, field-bus systems are an integral part of every production system. Depending on the manufacturer, different field-bus technologies are favored, which differ in terms of the connection structure, bus access and the standardized field-bus protocol. In many production systems, therefore, the requirement arises to combine the various field-bus technologies used into a common field-bus solution. Such an integration is realized by protocol converters, also referred to as gateways in the following.

Gateways may interconnect different, even heterogeneous networks and allow for routing across network boundaries. In this context, the gateway represents a common subscriber that belongs to the networks to be connected and handles the cross-network data traffic. Gateways perform protocol conversion when passing from one network to another and convert incoming data. Protocol data not supported by the target network may be omitted in the gateway, and additional protocol data required for onward transport may be added by the gateway.

An essential requirement for an automation system is error safety. When controlling and monitoring technical processes, it must be ensured that if the automation system operates incorrectly, this does not result in any danger to people or environment.

For transmitting safety-relevant messages between safety-relevant communication subscribers in a field-bus system, a safety-certified field-bus protocol, referred to in the following as safety-field-bus protocol, is used. Such a safety-field-bus protocol, generally also referred to as a safety communication protocol if there is no reference to a field bus, allows for safe message transmission on the field bus, even if there are any number of unsafe field-bus devices in the transmission path between the two safety-relevant communication subscribers and the transmission path therefore forms a so-called black channel.

The EN ISO 13849-1 and IEC/EN 62061 standards specify the safety-related performance of automation systems required for risk reduction. In order to achieve the desired safety-related performance, the safety-certified field and automation devices that form the safety-relevant subscribers in the network and for which a safety field-bus protocol is used generally have at least dual-channel hardware. Alternatively, single-channel hardware may also be used if the software is embodied with at least two channels.

In order to allow for communication between safety-relevant subscribers in networks that support different safety field-bus protocols, safety gateways with dual-channel hardware or software are then implemented in addition to conventional gateways.

However, dual-channel hardware brings about increased hardware costs. A dual-channel software, on the other hand, requires a powerful microprocessor as well as sufficient memory.

SUMMARY

The invention provides an improved protocol converter for cross-network data traffic of safety-relevant messages and a corresponding automation system.

According to a first aspect, a protocol converter converts safety-relevant messages between a first network and a second network, wherein the first and second networks use different network protocols for message exchange, wherein the first network comprises at least one first subscriber having a first safety communication layer which processes a first safety communication protocol, and wherein the second network comprises at least one second subscriber having a second safety communication layer which processes a second safety communication protocol. The protocol converter comprises a single-channel interface which allowing for message exchange with the first network and/or with the second network.

The protocol converter further comprises a single-channel filter connected to the interface for determining messages with the first safety communication protocol and messages with the second safety communication protocol from messages received by the interface device. The protocol converter further comprises an at least dual-channel safety module connected to the single-channel filter for converting messages with the first safety communication protocol detected by the filter into messages with the second safety communication protocol and for converting messages with the second safety communication protocol detected by the single-channel filter into messages with the first safety communication protocol, respectively.

According to a second aspect, an automation system comprises a first network and a second network using different network protocols, wherein the first network comprises at least one first subscriber having a first safety communication layer processing a first safety communication protocol, wherein the second network comprises at least one second subscriber having a second safety communication layer processing a second safety communication protocol, and wherein between the first network and the second network a protocol converter for converting safety-relevant messages between a first network and a second network is provided. The protocol converter comprises a single-channel interface which allowing for message exchange with the first network and/or with the second network.

The protocol converter further comprises a single-channel filter connected to the interface for determining messages with the first safety communication protocol and messages with the second safety communication protocol from messages received by the interface device. The protocol converter further comprises an at least dual-channel safety module connected to the filter for converting messages with the first safety communication protocol detected by the single-channel filter into messages with the second safety communication protocol and for converting messages with the second safety communication protocol detected by the single-channel filter into messages with the first safety communication protocol, respectively.

According to a second aspect, a protocol converter for converting safety-related messages between a first network and a second network comprises a single-channel interface that allows for message exchange with a network. The protocol converter further comprises a single-channel filter connected to the interface determines messages having a first safety communication protocol and messages having a second safety communication protocol from messages received by the interface device. The protocol converter further comprises a dual-channel safety module connected to the single-channel filter and converting the messages with the first safety communication protocol determined by the single-channel filter into messages with a second safety communication protocol, and converting the messages with the second safety communication protocol determined by the single-channel filter into messages with the first safety communication protocol.

EXAMPLES

In an automation system having a first network and a second network, in which the first and second networks use different network protocols for message exchange, and in which the first network comprises at least one first subscriber having a first safety communication layer that processes a first safety communication protocol and in which the second network comprises at least one second subscriber having a second safety communication layer that processes a second safety communication protocol, a protocol converter is provided between the first and second networks for converting safety-related messages between the first and the second network.

The protocol converter comprises a single-channel interface that allows for message exchange with the first network and/or with the second network. A single-channel filter connected to the interface determines messages having the first safety communication protocol and messages having the second safety communication protocol from messages received by the interface device. An at least dual-channel safety module connected to the single-channel filter then converts the messages with the first safety communication protocol determined by the filter into messages with the second safety communication protocol, or converts the messages with the second safety communication protocol determined by the single-channel filter into messages with the first safety communication protocol.

The protocol converter for cross-network data traffic of safety-relevant messages in the automation system may essentially be implemented as a single-channel system. Only the safety-relevant routines are embodied with at least two channels. This has the advantage that the hardware or software costs for a second channel may largely be saved.

The single-channel interface comprises a single-channel first interface enabling message exchange with the first network comprising the at least one first subscriber with the first safety communication layer processing the first safety communication protocol, and a single-channel second interface enabling message exchange with the second network comprising the at least one second subscriber with the second safety communication layer processing the second safety communication protocol.

Furthermore, the filter comprises a single-channel first filter for determining messages having the first safety communication protocol from messages received by the first interface and a single-channel second filter for determining messages having the second safety communication protocol from messages received by the second interface. The at least dual-channel safety module is connected to the first and second filters to convert messages with the first safety communication protocol determined by the first filter into messages with the second safety communication protocol and to convert messages with the second safety communication protocol determined by the second filter into messages with the first safety communication protocol, respectively.

This embodiment allows for integrated protocol conversion, in which protocol conversion of both non-safety-related messages and safety-related messages may be implemented in a single protocol converter.

The dual-channel safety module may have at least two parallel software function channels. A low-cost microcontroller requiring comparatively little memory because only a few safety-relevant software functions have to be implemented on two channels may then be used in the protocol converter.

A single-channel operating function module connected to the filter and the safety module may be provided in the protocol converter to cyclically call up the filter and the safety module. This embodiment ensures stable operation of the protocol converter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The figures are merely schematic and not to scale. Furthermore, the reference numerals in the figures are chosen unchanged if they are elements or components of the same embodiment.

In industrial automation, networks are used to connect distributed field devices of a sensor/actuator level with a control level. The automation networks, also referred to as field-bus systems, usually have a serial bus to which the network subscribers are connected. Different field bus concepts are used by the manufacturers which differ with regard to the connection structure, the bus access and the standardized field-bus protocol, also referred to as network protocol in the following if no reference to a field bus is indicated.

The network protocol defines how the data exchange between the subscribers in the network is to be carried out. In doing so, the network protocol determines the rules and formats for the communication behavior of the subscribers. The network protocol usually has a layered architecture, wherein the individual protocol layers are defined in the OSI reference model.

The message structure defined by the network protocol contains all information important for exchanging data, such as sender and recipient, message type, message size and checksum for tracing an error-free transmission. This information is prepended to the user data in the message as a header or appended as a trailer.

The possible network protocols may differ at various points. For example, the network protocol may specify that communication may only take place in one direction or that communication is possible in both directions at the same time. Furthermore, the network protocol may determine that the communication is synchronized with a clock signal or that it should be asynchronous. The network protocol may further determine the number of subscribers that are allowed to participate in the communication. Also, the network protocol may determine that a transmission is to be made to only one recipient, a transmission is to be made to multiple recipients, or a message transmission is to be made to all subscribers.

Furthermore, network protocols may differ with regard to the position of the subscribers. If all subscribers have equal rights, symmetrical communication takes place; otherwise, asymmetrical communication takes place. Network protocols also distinguish between synchronous communication, in which a response is waited for after a request, and asynchronous communication, in which no response is required. The network protocol may perform packet-oriented communication or be embodied to be connection-oriented.

The Ethernet protocol has established itself as the communication standard for short-range networks, especially for automation networks. Within the framework of the OSI layer model, the Ethernet protocol defines the two lowest protocol layers, the physical layer and the safety layer. For data transmission in the higher protocol layers, standard communication protocols such as the TCP/IP protocol may be used in the Ethernet concept.

The Ethernet protocol divides up the data to be transmitted into data packets, referred to as frames, the structure of which is defined in the IEEE 802.3 standard. The actual Ethernet frame is preceded by a preamble and a start bit, referred to as Start Frame Delimiter SFD. This is followed by the actual Ethernet data packet. The Ethernet data packet consists of a header section, a user data block and an end section, the trailer.

The header starts with a 6-byte field for the target address, followed by another 6-byte field with the source address. This may be followed by another 4-byte field, referred to as VLAN tag, with additional control data in the header which particularly contains prioritization information. The header ends with a 2-byte field, referred to as type field, which provides information on the protocol by which the data in the user data block are to be processed.

The user data block following the header may have a length of 1500 bytes, wherein larger data blocks may be permitted in different Ethernet protocol extensions, as well. The user data block is terminated by a field of variable length, referred to as PAD field, which guarantees the specified minimum length of the Ethernet frame.

The user data block is followed by the trailer, which has a 4-byte field with a checksum. When an Ethernet frame is created, a CRC calculation is performed over the bit sequence and the checksum is appended to the data block. The recipient performs the same calculation upon receipt. If the received checksum does not match the self-calculated checksum, the recipient assumes a faulty transmission. The Ethernet frame is then discarded.

The use of the Ethernet standard in industrial automation allows for providing real-time solutions. Real-time capable field-bus systems based on the Ethernet standard are e.g. PROFINET, EtherCAT, Powerlink or SERCOS III. The field-bus protocol used in each case is displayed in the type field in the header of the Ethernet frame.

In addition to the Ethernet standard, other field-bus protocols such as CANopen, Interbus or Profibus may also be used in automation systems.

Field-bus systems are often operated as master-slave systems. The master subscriber in the field-bus system is the controller that has bus access authorization and may output data to the field bus. The slave subscribers in the field-bus system are the field devices, such as I/O devices, valves, drives, sensors, transmitters, etc. They do not have bus access authorization and may only acknowledge received data and transmit data upon request by the master subscriber.

In master-slave systems, control via a field-bus system is then usually carried out in such a way that the master subscriber cyclically performs control processes in order to generate output data for slave subscribers and/or other slave subscribers on the basis of input data from slave subscribers.

After completion of a control process cycle, the master subscriber sends the output data in the form of messages on the field bus, wherein the slave subscribers take the output data assigned to the respective slave subscriber from the messages and execute a local subscriber process with this output data. The data determined by the local subscriber process is then in turn transmitted from the slave subscriber to the master subscriber and then used as input data for the next control process cycle by the master subscriber.

For direct connection of sensors and actuators in an automation system, simplified communication protocols may be used for exchanging data in addition to the field-bus system. One such field-bus system with a simplified communication protocol is the VO-Link system which consists of an VO-Link master subscriber and one or a plurality of VO-Link slave subscribers, the sensors and actuators. The VO-Link master subscriber provides the interface to the superordinate controller and controls communication with the connected VO-Link field devices.

A central requirement for automation systems is secure and reliable data transmission. To control and monitor technical processes in the context of industrial automation, it must be ensured that errors in the automation system are reliably detected. Therefore, additional safety measures are often implemented in the automation system to ensure that errors are detected with a high probability in order to minimize the risk of undetected errors.

The safety measures provided for risk reduction in automation systems are described in the EN ISO 13849-1 and IEC/EN 62061 standards. The safety measures required for the individual subscribers depend on the safety functions assigned to the respective subscriber. An essential safety measure is the redundant embodiment of the subscriber in the form of dual-channel hardware. Alternatively, single-channel hardware may also be used provided that the software is embodied with two channels.

A safety-certified communication protocol is still required for the transmission of safety-relevant messages between safety-relevant subscribers on the field bus.

Automation systems are often used in mixed operation with safety-relevant subscribers and non-safety-relevant subscribers, with any number of unsafe field-bus devices then being located between the safety-relevant subscribers on the field bus. The safety-certified communication protocols are usually embodied in such a way that safety-relevant messages may also be transmitted via a communication channel with unsecured properties, referred to as black channel. The safety protocol that corresponds to the safety level of the safety-related automation system and detects and controls transmission errors on the field bus is then integrated between the safety-related subscribers and the "non-safe" field bus.

Safety variants for the transmission of safety-relevant messages have been developed for the various field-bus protocols. For the Ethernet-based EtherCAT field-bus protocol, the safety variant Safety over EtherCAT, abbreviated FSoE, is e.g. provided. The safety derivative for PROFINET is PROFIsafe. For the simplified I/O-Link communication protocol, I/O-Link-Safety, a safety extension is provided, as well.

In complex production plants, the automation systems consist of different, also heterogeneous networks, in which different communication protocols are used in the individual network areas, depending on the manufacturer. To enable communication between the subscribers across network boundaries, protocol converters, also referred to as gateways in the following, are used between the individual networks to establish the connection between the networks.

The gateway is then a subscriber in each of the networks to be connected and handles the cross-network data traffic. In doing so, the gateway processes the forwarded messages by performing a protocol conversion between the networks. The gateway may add or remove protocol data as required.

If gateways are used in the context of a transmission of safety-relevant messages, the gateways must fulfill the corresponding safety-related requirements. In order to implement safety gateways in a cost-effective manner, the required dual-channel hardware or software embodiment is reduced to the core area.

The gateway then comprises an interface that enables message to be exchanged with the first network and with a second network. A single-channel filter is then connected to the interface device, which determines messages with a first safety communication protocol and messages with a second safety communication protocol from the messages received by the interface device.

An at least dual-channel safety module in the gateway connected to the filter converts messages with the first safety communication protocol determined by the filter into messages with the second safety communication protocol or into messages with the second safety communication protocol into messages by the first safety communication protocol.

With this embodiment, cross-network data traffic, including safety-relevant messages, may essentially be implemented in the gateway as a single channel. Only the safety-relevant routines in protocol conversion are implemented as two channels. The dual-channel safety module may be realized by at least two parallel software function channels. With the gateway, a low-cost microcontroller that requires comparatively little memory may then perform the safety-relevant protocol conversion in two channels.

The single-channel interface may thereby comprise a single-channel first interface allowing for message exchange with the first network comprising the at least one first subscriber with the first safety communication layer that processes the first safety communication protocol, and a single-channel second interface enabling message exchange with the second network comprising the at least second subscriber having the second safety communication layer that processes the second safety communication protocol.

Furthermore, the filter may comprise a single-channel first filter to determine messages having the first safety communication protocol from messages received from the first interface and a single-channel second filter to determine messages having the second safety communication protocol from messages received from the second interface.

The at least dual-channel safety module is then connected to the first and second filters to convert messages detected by the first filter using the first safety communication protocol into messages using the second safety communication protocol and to convert messages detected by the second filter using the second safety communication protocol into messages using the first safety communication protocol, respectively. A single-channel operational function module is further connected to the first filter, the second filter and the safety module to cyclically address the first filter, the second filter and the safety module.

This embodiment allows for integrated protocol conversion, in which protocol conversion of both non-safety-related messages and safety-related messages may be implemented in a single protocol converter.

Figure 1:
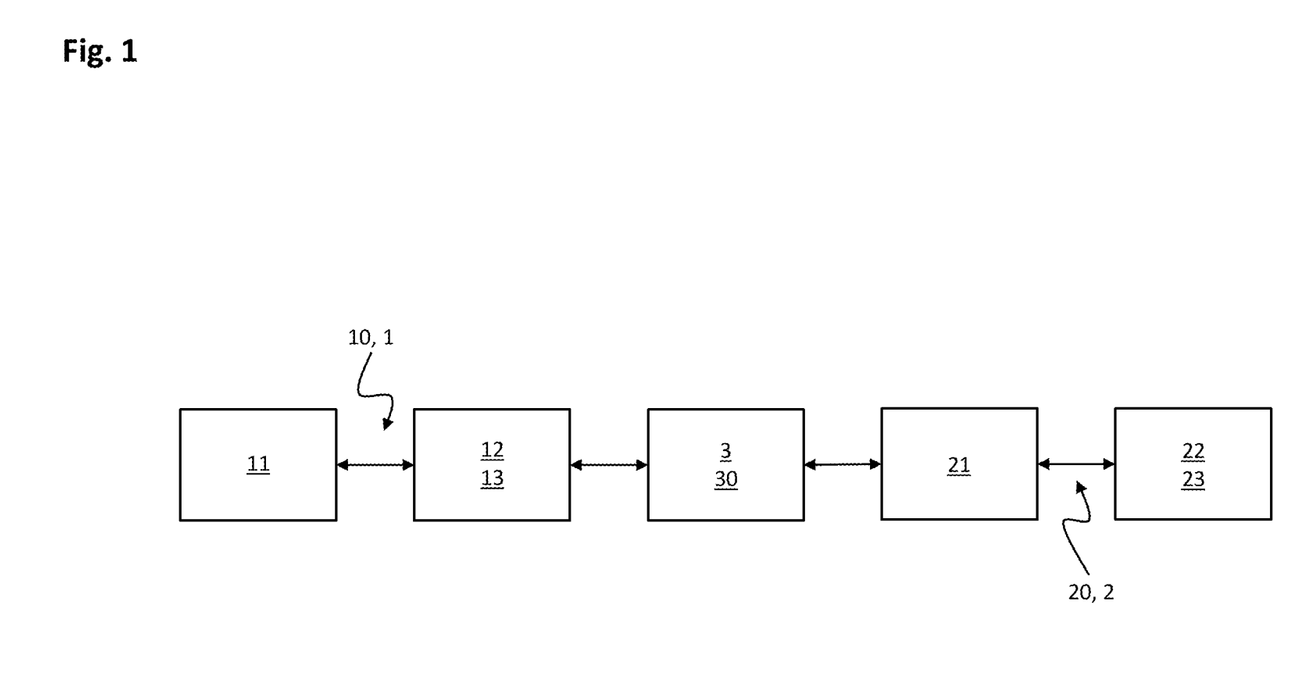
FIG. 1 shows an automation system having a safety gateway between an EtherCAT network and a PROFINET network, wherein the EtherCAT network comprises a subscriber with a safety communication layer that processes an FSoE communication protocol and the PROFINET network comprises a subscriber having a safety communication layer which processes a PROFIsafe communication protocol.

FIG. 1 schematically shows the basic structure of an automation system with a first network 10 and a second network 20, which are interconnected via a gateway, also referred to as protocol converter 30 in the following, which performs an integrated protocol conversion. Each network comprises at least one master subscriber forming the control level, and at least one slave subscriber representing the sensor/actuator level.

In each network, the master subscriber and the slave subscriber are connected to each other via a serial bus by which the messages are exchanged between the master subscriber and the slave subscriber takes place. The serial bus of the first network 10 is coupled to the serial bus of the second network 20 by the gateway.

The data transmission in the first network 10 and in the second network 20, respectively, is organized by the master subscriber in the form of data packets, wherein the Ethernet field-bus protocol EtherCAT is used in the first network 10 and the Ethernet field-bus protocol PROFINET is used in the second network 20. The first network 10 is therefore in the following referred to as EtherCAT network 1 and the second network 20 is in the following referred to as PROFINET network 2. The master subscriber in EtherCAT network 1 is then an EtherCAT master 11 and the master subscriber in the second PPROFINET network is a PPROFINET master 21.

The gateway that performs the data exchange between the EtherCAT network 1 and the PPROFINET network 2 is an EtherCAT/PPROFINET gateway 3 that performs a protocol conversion from the EtherCAT field-bus protocol to the PROFINET field-bus protocol and vice versa.

The two field-bus protocols EtherCAT and PROFINET used in the first and second network 10, 20 are only examples. Alternatively, it is also possible to use another field-bus protocol based on the Ethernet standard, but also a non-Ethernet-based field-bus protocol.

In the automation system shown in FIG. 1, both the slave subscriber in the EtherCAT network and the slave subscriber in the PPROFINET network are safety-relevant. The slave subscriber in the EtherCAT network 1, which is also referred to as the first subscriber 13, operates with the safety variant Safety over EtherCAT, abbreviated FSoE, of EtherCAT and is an FSoE safety subscriber 12. The EtherCAT master 11 of the EtherCAT network 1 controls the message transmission, but does not usually perform any independent process data processing, which is why the FSoE safety communication protocol does not have to be implemented in the EtherCAT master 11.

The slave subscriber in the PROFINET network 1, which is also referred to as the second subscriber 23, operates with the safety variant of PROFINET called PROFIsafe and is a PROFIsafe safety subscriber 22. The PROFINET master 21 of PROFINET network 2 then also uses the PROFIsafe safety communication protocol.

Furthermore, both the FSoE safety communication protocol and the PROFIsafe safety communication protocol are installed on the EtherCAT/PPROFINET gateway 3 for a protocol conversion between the EtherCAT network 1 and the PROFINET network 2. The EtherCAT/PPROFINET gateway 3 therefore represents a safety gateway.

Instead of a single safety-relevant slave subscriber, as shown in FIG. 1, any number of safety-relevant slave subscribers may also be provided on the respective field bus. Furthermore, non-safety-relevant subscribers may also be included in the individual networks in addition to safety-relevant subscribers. The control level in the networks may also be divided up among several master subscribers, depending on which field-bus protocol is used.

The exchange of messages between the EtherCAT network 1 and the PROFINET network 2 in the automation system shown in FIG. 1 takes place in the following manner:

The FSoE safety subscriber 12 generates an FSoE message that is retrieved by the EtherCAT master 11 and transmitted to the EtherCAT/PPROFINET gateway 3. In the EtherCAT/PPROFINET gateway 3, the FSoE message is converted into a PROFIsafe message. The EtherCAT/PROFINET gateway 3 passes the PROFIsafe message on to the PROFINET master 21, which sends the PROFIsafe message to the PROFIsafe safety subscriber 22, which interprets the PROFIsafe message.

In the opposite direction, the PROFIsafe safety subscriber 22 sends a PROFIsafe message to the PROFINET master 21, which transfers the PROFIsafe message to the EtherCAT/PROFIsafe gateway 3. The EtherCAT/PPROFINET gateway 3 converts the PROFIsafe message into an FSoE message. The FSoE message is then retrieved by the EtherCAT master 11 and transferred to the FSoE safety subscriber 21, which interprets the FSoE message.

The safety-relevant subscribers in the two networks, in the case of the illustration shown in FIG. 1 both the PROFINET master 21 and the slave subscribers FSoE safety subscriber 12 and PROFIsafe safety subscriber 22, comprise a safety communication layer for processing safety data. In accordance with the safety requirements, the safety communication layer is usually embodied with two channels in the form of hardware and/or software.

Figure 2:
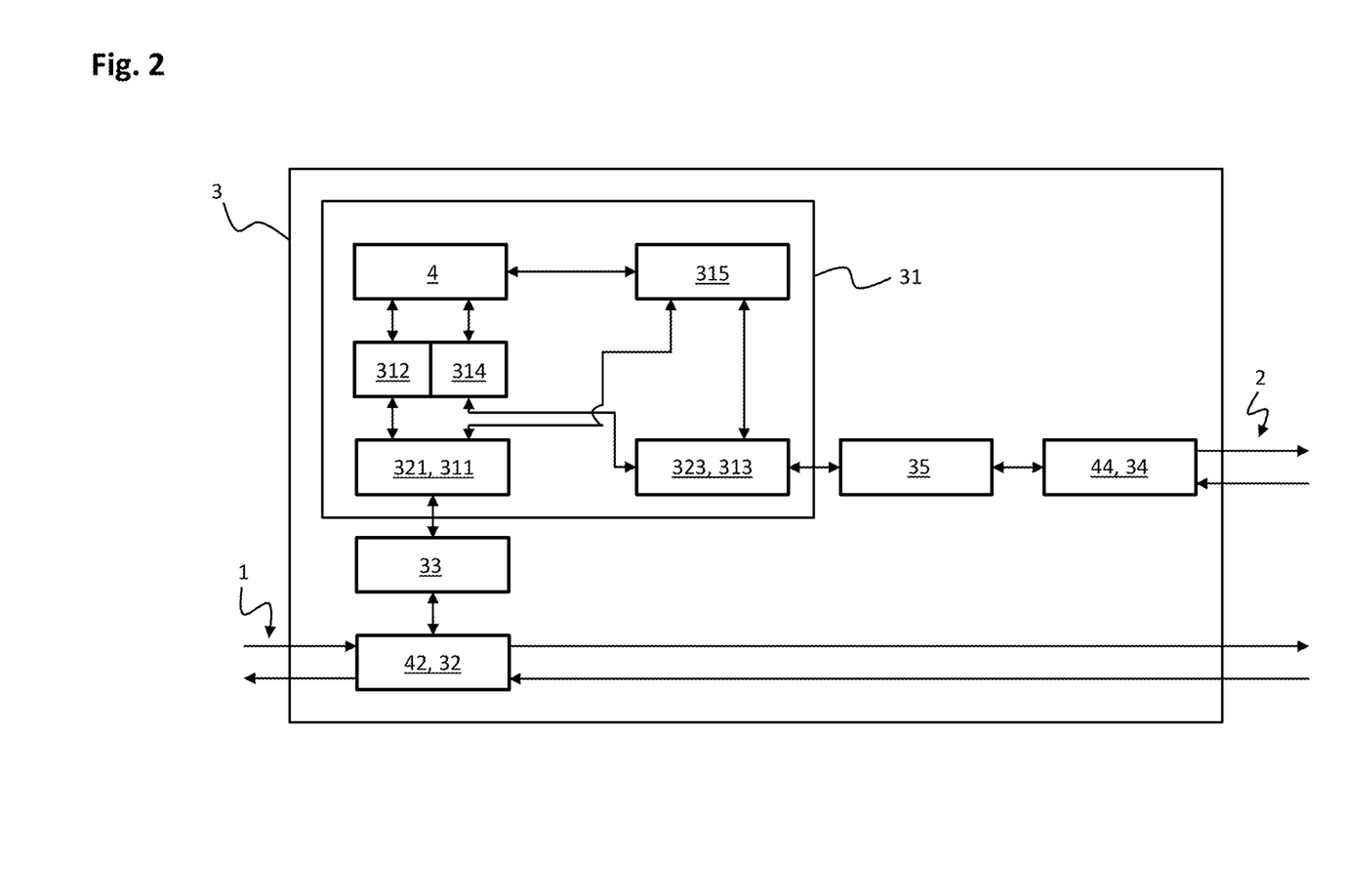
FIG. 2 shows the schematic structure of the safety gateway in the automation system of FIG. 1.

FIG. 2 shows in detail the structure of the EtherCAT/PROFINET gateway 3, which operates as a safety gateway. The EtherCAT/PROFINET gateway 3 thereby comprises a microcontroller 31 as the central unit.

For connection to the EtherCAT network 1, an EtherCAT slave controller 32 is provided as a single-channel first interface 42, which allows for data exchange using the messages on the EtherCAT field bus 1. The EtherCAT slave controller 32 is connected to an EtherCAT memory 33, which forms the interface between the EtherCAT slave controller 32 and the microcontroller 31 and in which the messages exchanged between the EtherCAT slave controller 32 and the EtherCAT field bus 1 are stored.

For connection to the PROFINET field bus 2, a PROFINET slave controller 34 is provided as a single-channel second interface 44 that performs data exchange with the messages on the PROFINET field bus 2. The PROFINET slave controller 34 is connected to a PROFINET memory 35, which forms the interface between the PROFINET slave controller 34 and the microcontroller 31. The messages exchanged between the PROFINET slave controller 34 and the PROFINET field bus are stored in the PROFINET memory 35.

On the microcontroller 31, a software module EtherCAT slave functions 311 is provided, which is connected to the EtherCAT memory 33 and, among other things, operates as a single-channel first filter 321 to determine FSoE messages from messages stored in the EtherCAT memory 33. The EtherCAT slave functions software module 311 is further connected to an FSoE memory 312 in which the FSoE messages are stored. The FSoE memory 312 in turn comprises an interface to a software module safety functions 4, which forms a dual-channel safety module.

A software module PROFINET slave functions 313 is further provided on the microcontroller 31, which is connected to the PROFINET memory 35 and, among other things, operates as a single-channel second filter 323 to determine PROFIsafe messages from the messages stored in the PROFINET memory 35. The software module PROFINET slave functions 313 is further connected to a PROFIsafe memory 314 in which the PROFIsafe messages are stored. The PROFIsafe memory 314 also comprises an interface to the dual-channel software module safety functions 4.

A black channel is present in the EtherCAT/PROFINET gateway 3 up to the safety functions 4 software module. The safety module safety functions 4 may then detect changes in the FSoE messages or the PROFIsafe messages. The software module safety functions 4 is further embodied to convert FSoE messages into PROFIsafe messages and PROFIsafe messages into FSoE messages.

A single-channel operational function module 315 connected to the EtherCAT slave functions software module 311, the PROFINET slave functions software module 313, and the safety functions software module 4 is further provided on the microcontroller 31 to cyclically address the EtherCAT slave functions software module 311, the PROFINET slave functions software module 313, and the safety functions software module 4.

The EtherCAT/PROFINET gateway 3 operates as follows when converting a FSoE message into a PROFIsafe message:

The FSoE message contained in an EtherCAT data packet is received by the EtherCAT slave controller 32 via the EtherCAT network 1 and written to the EtherCAT memory 33. From the EtherCAT memory 33 the FSoE message is transferred by the single-channel software module EtherCAT slave functions 311 to the FSoE memory 312.

The black channel in the EtherCAT/PROFINET gateway 3 extends to the FSoE memory 312. The dual-channel safety module safety functions 4 may detect changes to the FSoE message stored in the FSoE memory 312. The dual-channel software module safety functions 4 converts the FSoE message into the PROFIsafe message and stores it in the PROFIsafe memory 314.

The single-channel software module PROFINET slave functions 313 copies the PROFIsafe message from the PROFIsafe memory 313 to the PROFINET memory 35. If a corresponding PROFINET data packet is received by the PROFINET slave controller 34 to read the PROFINET memory 35, the PROFIsafe message is inserted into the PROFINET data packet by the PROFINET slave controller 34.

The EtherCAT/PROFINET gateway 3 operates as follows when converting a PROFIsafe message into a FSoE message:

The PROFIsafe message contained in a PROFINET data packet is received by the PROFINET slave controller 34 and written to the PROFINET memory 35. From the PROFINET memory 35, the PROFIsafe message is transferred by the single-channel software module PROFINET slave functions 313 to the PROFIsafe memory 314.

The black channel of the EtherCAT/PROFINET gateway 3 further includes the PROFIsafe memory 314. The dual-channel safety module safety functions 4 may then detect changes to the PROFIsafe message stored in the PROFIsafe memory 314. The dual-channel software module safety functions 4 converts the PROFIsafe message into the FSoE message and stores the FSoE message in the FSoE memory 312.

The single-channel software module EtherCAT slave functions 311 copies the FSoE message from the FSoE memory 312 into the EtherCAT memory 33. If a corresponding EtherCAT data packet is received by the EtherCAT controller 32 to read the EtherCAT memory 33, the FSoE message is inserted into the EtherCAT data packet by the EtherCAT controller 32.

A software module operating function module 315 ensures that the dual-channel software module safety functions 4 as well as the one-channel software module EtherCAT slave functions 311 and the one-channel software module PROFINET slave functions 313 are addressed cyclically to execute the operations described above.

The EtherCAT/PROFINET gateway 3 shown in FIG. 2 is embodied in such a way that a protocol conversion of EtherCAT messages and PPROFINET messages as well as of PROFIsafe messages and FSoE messages is implemented. It is furthermore possible to provide separate protocol conversion of the safety-relevant messages and of the non-safety-relevant messages instead of an integrated protocol conversion. The two functions may then be executed separately in independent gateways instead of jointly in one gateway.

Figure 3:
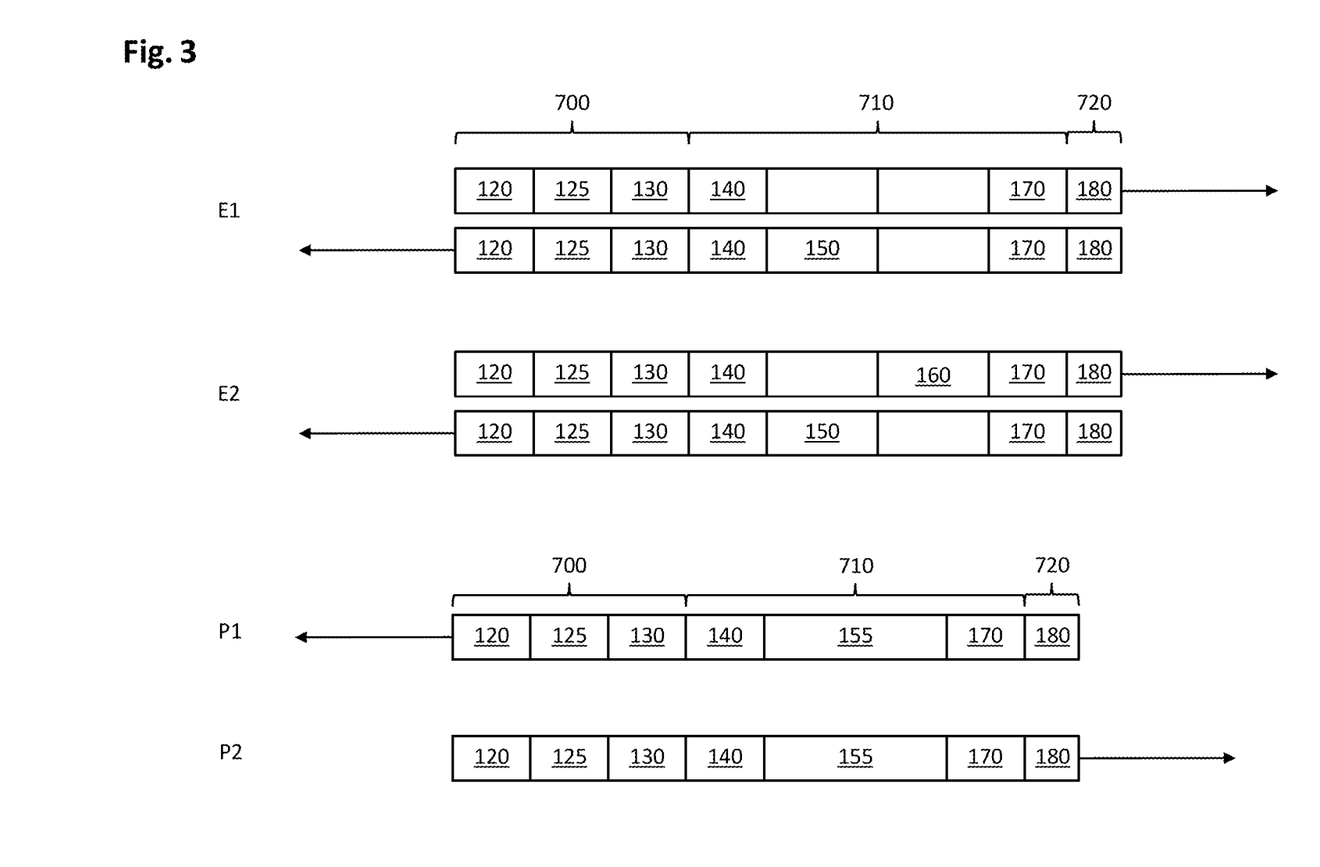
FIG. 3 shows a flow chart of a transmission of a safety-relevant message in the automation system of FIG. 1 from the FSoE safety subscriber in the EtherCAT network to the PROFIsafe safety subscriber in the PROFINET network.

The safety gateway, which in FIG. 3 is embodied as a combined EtherCAT slave subscriber and PROFINET slave subscriber, may then also be only an EtherCAT slave subscriber or a PROFINET slave subscriber. Then, only the software module EtherCAT slave functions and the EtherCAT slave controller are provided for connection to the EtherCAT network or the software module PROFINET functions and the PROFINET slave controller is provided for connection to the PROFINET network. The software module safety functions is further embodied to convert FSoE messages into PROFIsafe messages and PROFIsafe messages into FSoE messages.

The conversion from the EtherCAT data packet to the PROFINET data packet, if the safety gateway is only embodied as an EtherCAT slave subscriber, takes place in a downstream EtherCAT/PROFINET gateway. Such a downstream EtherCAT/PROFINET gateway also performs the conversion from the PROFINET data packet to the EtherCAT data packet if the safety gateway is embodied exclusively as a PROFINET slave subscriber.

The safety gateway may basically be embodied as a subscriber of a freely selectable communication system, since both the FSoE protocol and the PROFIsafe protocol may transmit on any communication path. In this case, the software module EtherCAT slave functions 311 or the software module PROFINET slave functions 313 must be replaced by a corresponding software module, the EtherCAT slave controller 32 or the PROFINET slave controller 34 must be replaced by a corresponding controller, a serial interface or a dual-port RAM memory, and the EtherCAT network 1 or the PROFINET network 2 must be replaced by a corresponding network or a corresponding field bus, a point-to-point connection or a data bus.

Figure 4:
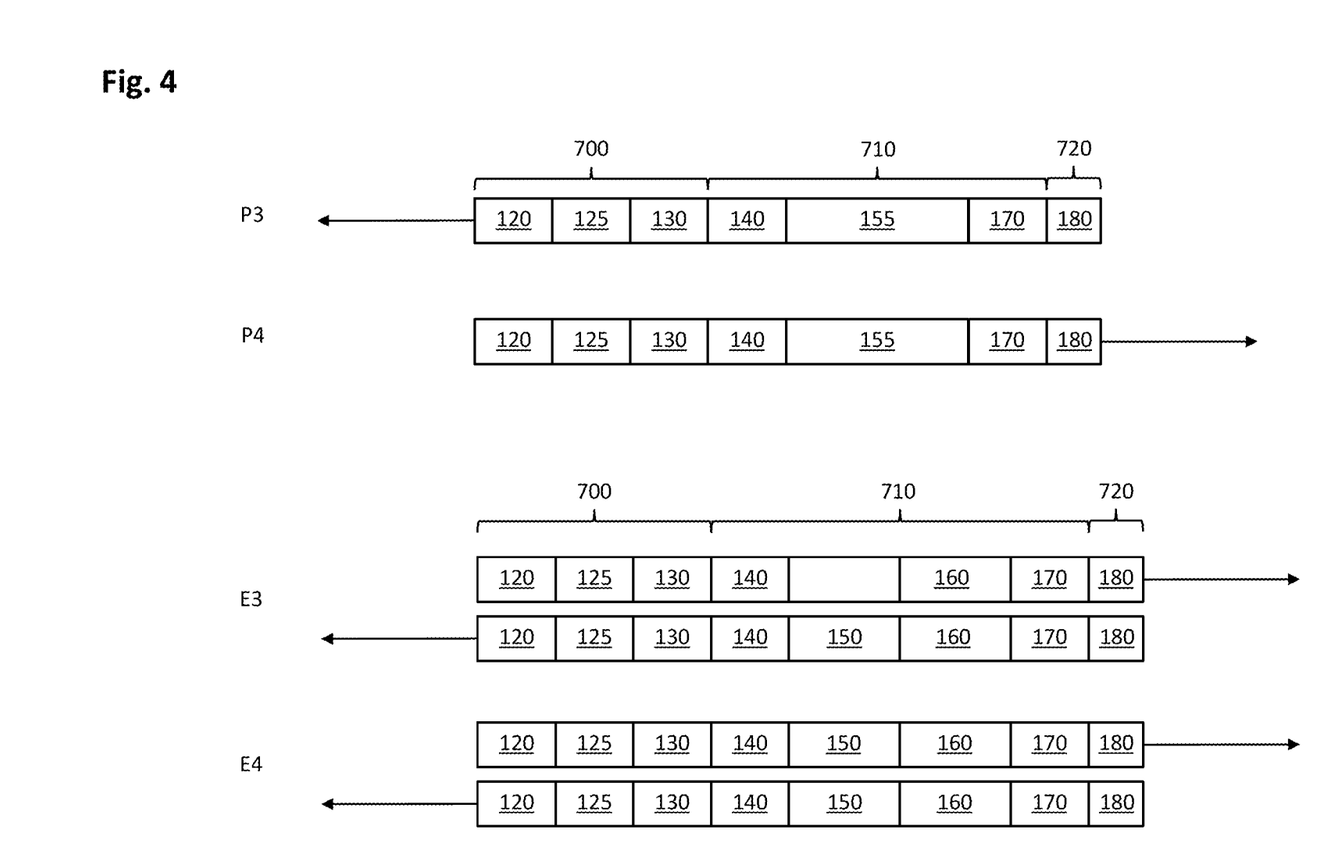
FIG. 4 shows a flow chart of a transmission of a safety-relevant message in the automation system of FIG. 1 from the PROFIsafe safety subscriber in the PROFINET network to the FSoE safety subscriber in the EtherCAT network.

FIG. 3 and FIG. 4 show a data transmission between the FSoE safety subscriber 12 and the PROFIsafe safety subscriber 22 in the automation network shown in FIG. 1, wherein FIG. 3 shows a transmission of FSoE data from the FSoE safety subscriber 12 to the PROFIsafe safety subscriber 22 and FIG. 4 shows a transmission of PROFIsafe data from the PROFIsafe safety subscriber 22 to the FSoE safety subscriber 12.

Data are transmitted by Ethernet data packets, which, as described above, consist of a header 700, a user data block 710, and a trailer 720 comprising the data packet checksum CRC.

The header 700 of the Ethernet data packets comprises the target address DA in a target address field 120, the source address SA in a source address field 125 and the EtherType in a type field 130. In the type field 130, the Ethernet field-bus protocol is specified by which the data in the user data block is to be processed. For example, the EtherCAT protocol has the value 0x88A4 and the PROFINET protocol has the value 0x8892.

Since when using the EtherCAT protocol the Ethernet data packets are sent by the master subscriber and after processing are also received again by the slave subscribers in passing, no value used for addressing is entered in the header both for the target address DA, i.e. in the target address field 120 and the source address SA, i.e. in the source address field 125. When using the PROFINET protocol, however, the Ethernet data packets that are exchanged between the master subscriber and the slave subscribers are addressed, which is why a value is entered in the header 700 in each case in the target address field 120 for the target address DA and in the source address field 130 for the source address SA.

The user data block 710 of the Ethernet data packets then comprises its own protocol header field 140 with control data of the respective field-bus protocol used, i.e. either EtherCAT or PROFINET. This is then followed by the actual user data area.

Since in the EtherCAT protocol the Ethernet data packets are processed by the slave subscribers in passing, each slave subscriber at the field bus has its own data block area in the user data area, which is part of a datagram. This data block area is also referred to as datagram field in the following. As an example, FIGS. 3 and 4 show a first datagram field 150 and a second datagram field 160. In the PROFINET protocol, on the other hand, data in the user data area is intended for the field-bus subscriber named in the respective target address. Thus, as an example, only one user data field 155 is shown in FIGS. 3 and 4.

The user data block is terminated by a trailer area end field 170 of the respective field-bus protocol used, i.e. either EtherCAT end or PROFINET end.

Trailer 720 then comprises the respective data packet checksum CRC in a trailer field 180.

As FIG. 3 shows, the EtherCAT master 11 sends a first EtherCAT data packet E1 having two empty datagrams in the user data area to the two EtherCAT slave subscribers FSoE safety subscriber 12 and EtherCAT/PROFINET gateway 3. For reasons of clarity, the corresponding first and/or second datagram field 150, 160 is absent for an empty datagram. The FSoE safety subscriber 12 enters first data "FSoE message with FSoE data" as write data into the assigned first datagram field 150 of the first EtherCAT data packet E1 when the first EtherCAT data packet E1 passes through. Since there are not yet any write data in the EtherCAT/PROFINET gateway 3, the assigned second datagram field 160 of the first EtherCAT data packet E1 remains empty.

The EtherCAT master 11 then receives the first EtherCAT data packet E1 again and copies the first data "FSoE-message with FSoE-data". The EtherCAT master 11 subsequently sends a second EtherCAT data packet E2 with the first data "FSoE-message with FSoE-data" as read data in the second datagram field 160 for the EtherCAT slave EtherCAT/PROFINET gateway 3.

The EtherCAT slave controller 32 of the EtherCAT/PROFINET gateway 3 reads the first data "FSoE message with FSoE data" from the assigned second datagram field 160 in the second EtherCAT data packet E2 when the second EtherCAT data packet E2 passes through. The second datagram field 160 of the second EtherCAT data packet E2 assigned to the EtherCAT/PROFINET gateway 3 is then not written into further and remains empty, since there are still no write data in the EtherCAT/PROFINET gateway 3.

The FSoE safety subscriber 12, on the other hand, enters second data "FSoE message with FSoE data" as write data into the assigned first datagram field 150 of the second EtherCAT data packet E2 when the second EtherCAT data packet E2 passes through. The second data "FSoE-message with FSoE-data" thereby correspond to the first data "FSoE-message with FSoE-data" as long as the FSoE-safety subscriber 12 has not yet received a response and the FSoE-safety subscriber 12 therefore has not yet generated new data in reaction to the response. The EtherCAT master 11 then receives the second EtherCAT data packet E2 comprising the second data "FSoE message with FSoE data".

The processing of the first data "FSoE-message with FSoE-data" in the EtherCAT/PROFINET gateway 3 shown in FIG. 2 is carried out as follows:

In the EtherCAT/PROFINET gateway 3 the single-channel software module EtherCAT slave functions 311 copies the first data "FSoE message with FSoE data" from the EtherCAT memory 33 of the EtherCAT slave controller 32 to the FSoE memory 312 of the microcontroller 31. From the FSoE memory 312, the dual-channel software module safety functions 4 reads the first data "FSoE message with FSoE data", then converts the data into first data "PROFIsafe message with FSoE data" and subsequently stores the first data "PROFIsafe message with FSoE data" in the PROFIsafe memory 314 of the microcontroller 31.

The single-channel software module PROFINET slave functions 313 reads the first data "PROFIsafe message with FSoE data" from the PROFIsafe memory 313 of the microcontroller 31 and stores the first data "PROFIsafe message with FSoE data" in the PROFINET memory 35.

As further shown in FIG. 3, the PROFINET slave controller 34 sends the first data "PROFIsafe message with FSoE data" stored in the PROFINET memory 35 in a user data field 155 of a first PROFINET data packet P1 to the PROFINET master 21. In the first PROFINET data packet P1, the PROFINET master 21 is specified as the target address DA in the header 700 in the target address field 120 and the EtherCAT/PROFINET gateway 3 is specified as the source address SA in the source address field 125.

The PROFINET master 21 receives the first PROFINET data packet P1, copies the first data "PROFIsafe message with FSoE data" and sends a second PROFINET data packet P2 to the PROFINET slave subscriber PROFIsafe safety subscriber 22. In the second PROFINET data packet P2, the PROFIsafe safety subscriber 22 is specified as the target address DA in the header 700 in the target address field 120 and the PROFINET master 21 is specified as the source address SA in the source address field 125. After receiving the second PROFINET data packet P2, the PROFIsafe safety subscriber 22 then reads out the first data "PROFIsafe message with FSoE data" from the user data field 155.

In FIG. 4, PROFIsafe data are then transmitted from the PROFIsafe safety subscriber 22 to the FSoE safety subscriber 12 in response to the received FSoE data. For this purpose, the PROFINET slave subscriber PROFIsafe-safety subscriber 22 sends a third PROFINET data packet P3 with the first data "PROFIsafe message with PROFIsafe data" in user data field 155 to the PROFINET master 21. In the third PROFINET data packet P3, the PROFINET master 21 is specified as the target address DA in the header 700 in the target address field 120 and the PROFIsafe safety subscriber 22 is specified as the source address SA in source address field 125.

The PROFINET master 21 receives the third PROFINET data packet P3 and copies the data "PROFIsafe message with PROFIsafe data" into the user data field 155 of a fourth PROFINET data packet P4. The PROFINET master 21 then sends the fourth PROFINET data packet P4 to the EtherCAT/PROFINET gateway 3. In the fourth PROFINET data packet P4, the EtherCAT/PROFINET gateway 3 is specified in the header 700 as the target address DA in target address field 120 and the PROFINET master 21 is specified as the source address SA in source address field 125.

The processing of the first data "PROFIsafe message with PROFIsafe data" in the EtherCAT/PROFINET gateway 3 shown in FIG. 2 is carried out as follows:

The PROFINET slave controller 34 of the EtherCAT/PROFINET gateway 3 stores the first data "PROFIsafe message with PROFIsafe data" from the fourth PROFINET data packet P4 in the PROFINET memory 35. The single-channel software module PROFINET slave functions 313 of the EtherCAT/PROFINET gateway 3 then transfers the first data "PROFIsafe message with PROFIsafe data" into the PROFIsafe memory 314 of the microcontroller 31.

The dual-channel software module safety functions 4 reads out the first data "PROFIsafe message with PROFIsafe data" from the PROFIsafe memory 314, converts the first data "PROFIsafe message with PROFIsafe data" into first data "FSoE message with PROFIsafe data" and then stores the first data "FSoE message with PROFIsafe data" in the FSoE memory 312 of the microcontroller 31. From there, the single-channel software module EtherCAT slave functions 311 reads out the first data "FSoE message with PROFIsafe data" and writes the first data "FSoE message with PROFIsafe data" as write data into the EtherCAT memory 33 of the EtherCAT slave controller 32.

As FIG. 4 further shows, the EtherCAT master 11 sends a third EtherCAT data packet E3 to the EtherCAT slave subscribers FSoE safety subscriber 12 and EtherCAT/PROFINET gateway 3. The datagram assigned to FSoE safety subscriber 12 is empty, since no data for the FSoE safety subscriber 12 is available in the EtherCAT master 11. In the datagram for the EtherCAT/PROFINET gateway 3, however, the EtherCAT master 11 has entered the second data "FSoE message with FSoE data" from the second EtherCAT data packet E2 as read data into the second datagram field 160. The second data "FSoE-message with FSoE-data" correspond to the first data "FSoE-message with FSoE-data" as long as the FSoE-safety subscriber 12 has not yet received a response and the FSoE-safety subscriber 12 has therefore not yet generated any new data in reaction to the response.

The EtherCAT slave controller 32 of the EtherCAT/PROFINET gateway 3 reads out the second data "FSoE message with FSoE data" from the assigned second datagram field 160 in the third EtherCAT data packet E3 when the third EtherCAT data packet E3 passes through. Subsequently, the EtherCAT slave controller 32 of the EtherCAT/PROFINET gateway 3 then enters the first data "FSoE message with PROFIsafe data" into the assigned second datagram field 160 of the third EtherCAT data packet E3.

The processing of the second data "FSoE-message with FSoE-data" is carried out in the EtherCAT/PROFINET gateway 3 in the same way as for the first data "FSoE-message with FSoE-data" to generate second data "PROFISafe-Message with FSoE-Data", which is then intended for the PROFINET slave subscriber PROFIsafe-safety subscriber 22.

When the third EtherCAT data packet E3 passes through, the FSoE safety subscriber 12 also enters third data "FSoE message with FSoE data" into the assigned first datagram field 150 of the third EtherCAT data packet E3. The third data "FSoE message with FSoE data" correspond to the first and second data "FSoE message with FSoE data", respectively, as long as the FSoE safety subscriber 12 has not yet received a response and the FSoE safety subscriber 12 has therefore not yet generated any new data in reaction to the response. The EtherCAT master 11 then receives the third EtherCAT data packet E3 on the return path.

From the third EtherCAT data packet E3, the EtherCAT master 11 copies the first data "FSoE message with PROFIsafe data" as read data for the EtherCAT slave subscriber FSoE safety subscriber 12 into the assigned first datagram field 150 of a fourth EtherCAT data packet E4. Furthermore, the EtherCAT master 11 transfers the third data "FSoE message with FSoE data" from the third EtherCAT data packet E3 as read data into the second datagram field 160 for the EtherCAT slave subscriber EtherCAT/PROFINET gateway 3 in the fourth EtherCAT data packet E4.

The EtherCAT master 11 sends the fourth EtherCAT data packet E4 to the EtherCAT slave subscriber FSoE safety subscriber 12 and EtherCAT/PROFINET gateway 3. When the fourth EtherCAT data packet E4 passes through, the EtherCAT slave subscriber FSoE safety subscriber 12 reads out the first data "FSoE message with PROFIsafe data" from the assigned first datagram field 150 of the fourth EtherCAT data packet E4. Subsequently, the FSoE safety subscriber 12 then enters the fourth data "FSoE message with FSoE data" into the assigned first datagram field 150 of the fourth EtherCAT data packet E4. The fourth data "FSoE message with FSoE data" correspond to the first, second and third data "FSoE message with FSoE data", respectively, as long as the FSoE safety subscriber 12 has not yet received a response and the FSoE safety subscriber 12 has therefore not yet generated any new data in reaction to the response.

Furthermore, the EtherCAT slave controller 32 of the EtherCAT/PROFINET gateway 3 reads out the third data "FSoE message with FSoE data" from the assigned second datagram field 160 in the fourth EtherCAT data packet E4 when the fourth EtherCAT data packet E4 passes through. The processing of the third data "FSoE-message with FSoE-data" is carried out in the EtherCAT/PROFINET gateway 3 in the same way as for the first data "FSoE-message with FSoE-data" to generate third data "PROFISafe-message with FSoE-data" which is then destined for the PROFINET slave subscriber PROFIsafe-safety subscriber 22.

After reading out the third data "FSoE-message with FSoE-data" from the assigned second datagram field 160 in the fourth EtherCAT data packet E4, the EtherCAT slave controller 32 of the EtherCAT/PROFINET gateway 3 enters second data "FSoE-message with PROFIsafe-data" into the assigned second datagram field 160 of the fourth EtherCAT data packet E4. The EtherCAT/PROFINET gateway 3 has generated the second data "FSoE-message with PROFIsafe-data" from second data "PROFIsafe-message with PROFIsafe-data", which was transmitted with two further PROFINET data packets in the same way as the first data "PROFIsafe-message with PROFIsafe-data" from the PROFIsafe safety subscriber 22 via the PROFINET master 21 to the EtherCAT/PROFINET gateway 3.

The EtherCAT master 11 then receives the fourth EtherCAT data packet E4 having the fourth data "FSoE message with FSoE data" and the second data "FSoE message with PROFIsafe data". Data transmission between the FSoE safety subscriber 12 and the PROFIsafe safety subscriber 22 is then continued in the manner explained in conjunction with FIG. 3 and FIG. 4.

Figure 5:
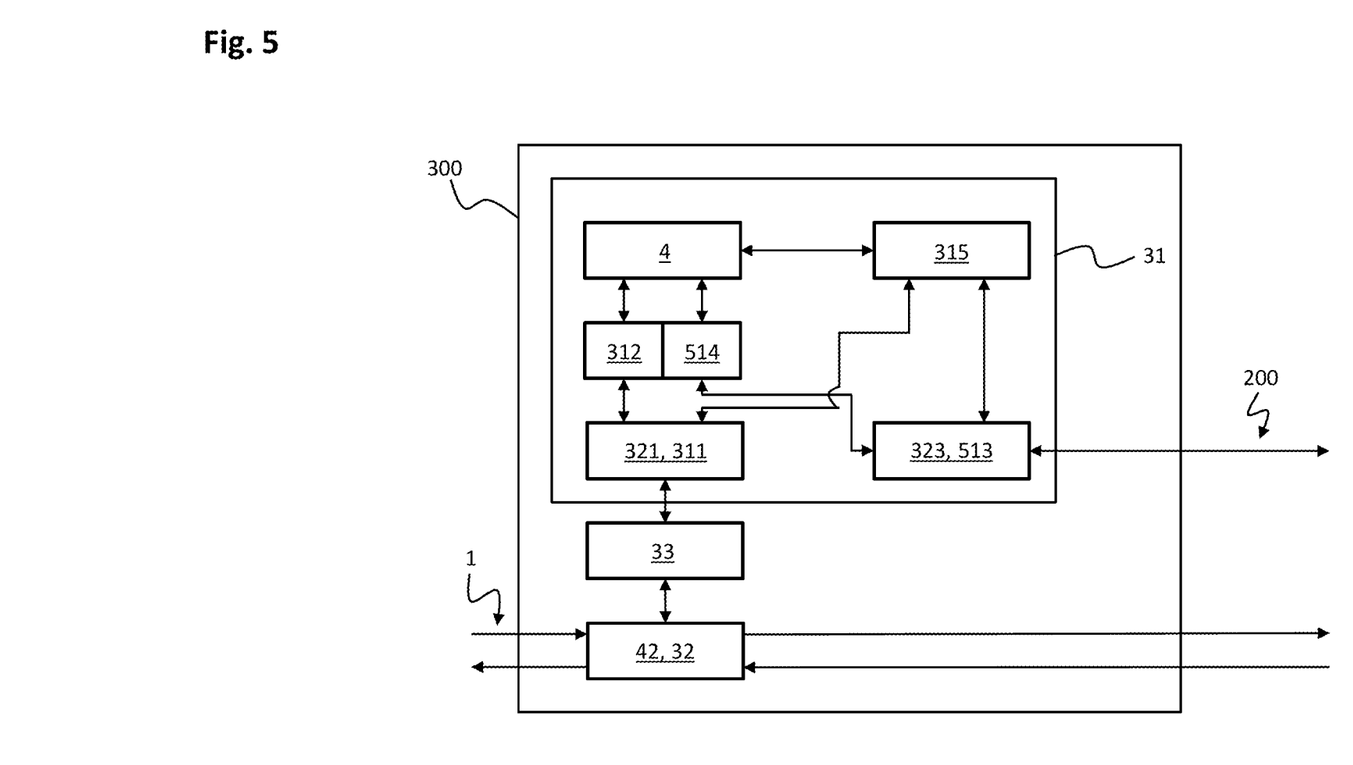
FIG. 5 shows the schematic structure of a safety gateway having an EtherCAT interface and an I/O-Link interface.

FIG. 5 shows an implementation of an EtherCAT/IO-link gateway 300 an FSoE/IO-link safety protocol implementation. The components of the EtherCAT/IO-link gateway 300, which correspond to components of the EtherCAT/PROFINET gateway 3 shown in FIG. 2, are provided with the same reference numerals and are not described again below.

The EtherCAT/IO-link gateway 300 is directly connected to an IO-link network 200 with a single-channel software module IO-link master functions 513 arranged on the microcontroller 31 as an interface to exchange messages with an IO-link safety slave subscriber. The single-channel software module IO-link master functions 513 operates, inter alia, as a single-channel second filter 323 to determine IO-link safety messages from messages received from the IO-link slave subscriber.

The IO-link master functions software module 513 is further connected to an IO-link safety memory 514 in which the IO-link safety messages are stored. The IO-link safety memory 514 also has an interface to the dual-channel software module safety functions 4.

A black channel is present in the EtherCAT/IO-link gateway 300 up to the software module safety functions 4. The safety functions software module 4 may then detect changes to the IO-link safety messages. The safety functions software module 4 is also embodied to convert FSoE messages into IO-link safety messages and IO-link safety messages into FSoE messages.

The EtherCAT/IO-link gateway 300 operates as follows when converting an FSoE message into an IO-link safety message: An FSoE message in an EtherCAT data packet is written to the EtherCAT memory 33 by the EtherCAT slave controller 32, said EtherCAT memory 33 being the interface between the EtherCAT slave controller 32 and the microcontroller 31. From the EtherCAT memory 33, the FSoE message is transferred by the single-channel software module EtherCAT slave functions 311 to the FSoE memory 312, which forms the interface to the dual-channel software module safety functions 4.

The black channel extends up to the dual-channel software module safety functions 4, wherein the dual-channel safety module safety functions 4 detects changes to the FSoE message. The dual-channel software module safety functions 4 converts the FSoE message into an IO-link Safety message and stores the IO-link Safety message in the IO-link Safety memory 514, which forms the interface between the dual-channel software module safety functions 4 and the single-channel software module IO-link master functions 513. The single-channel software module IO-link master functions 513 reads the IO-link safety message from the IO-link safety memory 514 and then sends the IO-link safety message to the IO-link safety slave subscriber.

Conversely, an IO-link safety message sent by the IO-link safety slave subscriber is received by the single-channel software module IO-link master functions 513 and copied to the IO-link safety memory 514, which forms the interface to the dual-channel software module safety functions 4. The black channel extends up to this point, wherein the dual-channel safety module safety functions 4 detects changes to the IO-link safety message.

The dual-channel software module safety functions 4 converts the IO-link Safety message into an FSoE message and stores the FSoE message in the FSoE memory 312, which forms the interface between the dual-channel software module safety functions 4 and the single-channel software module EtherCAT slave functions 311. The single-channel software module EtherCAT slave functions 311 copies the FSoE message from the FSoE memory 312 into the EtherCAT memory 33, which forms the interface between EtherCAT slave controller 32 and the single-channel software module EtherCAT slave functions 311.

If an EtherCAT data packet is received by the EtherCAT slave controller 32 to read the EtherCAT memory 33 of the EtherCAT/IO-link gateway 300, the FSoE message is inserted into the EtherCAT data packet from the EtherCAT slave controller 32 in passing.

The software module operational function module 315 provided on the microprocessor 31 ensures that the dual-channel software module safety functions 4, the single-channel software module IO-link Master Functions 513 and the single-channel module EtherCAT slave functions 311 are addressed cyclically.

The EtherCAT/IO-link gateway 300 is shown as an EtherCAT slave subscriber. However, the safety gateway could also be a subscriber of another field-bus system, since the FSoE protocol is not restricted to transmission on the EtherCAT field bus.

Figure 6:
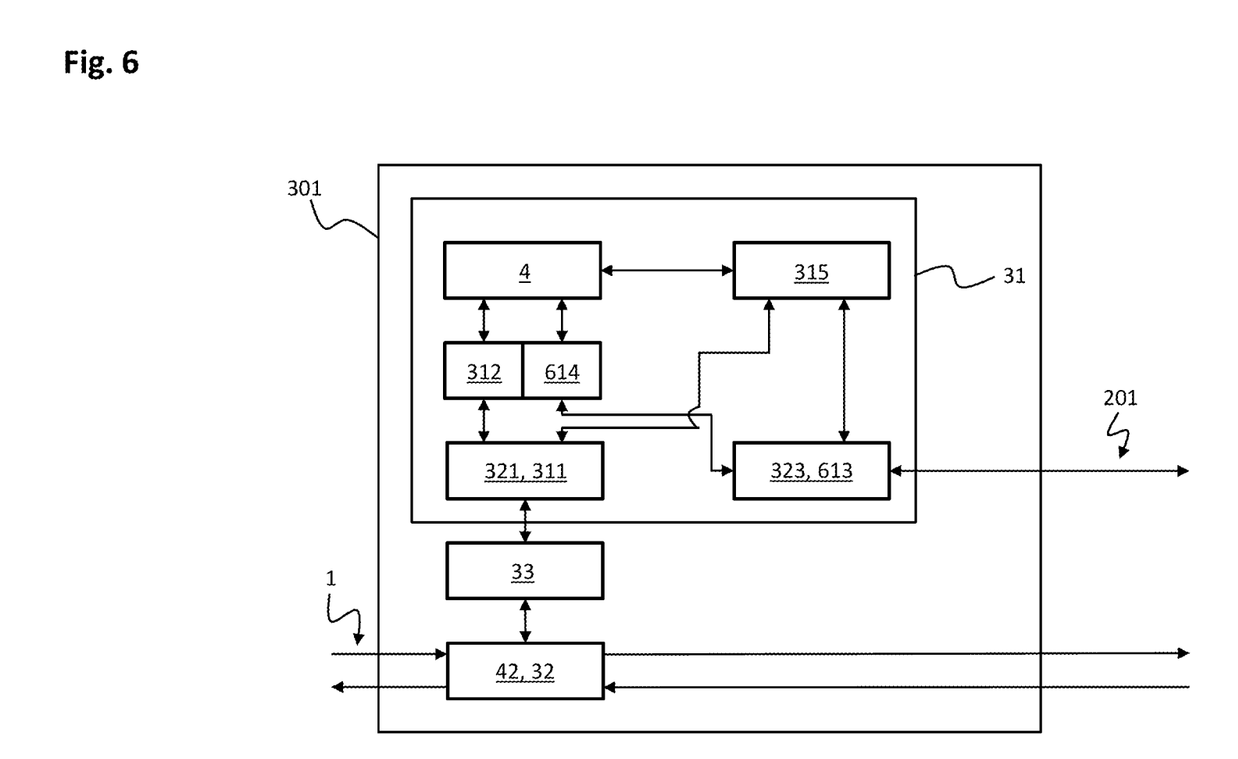
FIG. 6 shows the schematic structure of a safety gateway having an EtherCAT interface and a general hardware interface.

FIG. 6 shows the structure of a safety gateway that performs a conversion between the FSoE protocol and a safety hardware protocol. Components that correspond to components of the EtherCAT/PROFINET gateway 3 shown in FIG. 2 are indicated by the same reference numerals and are not described again below.

The safety gateway, further referred to as EtherCAT/hardware gateway 301 is connected to a hardware 201 by means of a single-channel software module standard functions arranged on the microcontroller 31 to exchange messages with a hardware subscriber. The interface of the standard functions software module 613 to the hardware 201 may e.g. be an IO port, a serial port, a data bus, or a field bus.

The single-channel software module standard functions 613 inter alia operates as a single-channel second filter 323 to determine safety messages from messages received from the hardware subscriber. The software module standard functions 613 may further contain any other non-safety related functions.

The standard functions software module 613 is further connected to a safety memory 614, in which the safety messages are stored. The safety memory 614 also comprises an interface to the dual-channel software module safety functions 4.

A black channel extends up to the software module safety functions 4 in the EtherCAT/hardware gateway 301. The software module safety functions 4 may then detect changes to the safety messages. The software module safety functions 4 is embodied to convert FSoE messages into safety messages and safety messages into FSoE messages.

It is possible for the safety functions software module 4 to also comprise a hardware interface. It may also be provided that the safety functions 4 software module to execute any software functions. The software functions may e.g. also be configurable, similar to a safety logic. The software module safety functions 4 may then process data that are received or sent via the hardware interface, from the other software modules in the gateway or via the FSoE message. Such an embodiment of the software module safety functions 4 is also possible for the gateways shown in FIG. 2 and FIG. 5.

When converting an FSoE message into a safety message, the EtherCAT/hardware gateway 301 operates as follows: An FSoE message in an EtherCAT data packet is to the EtherCAT memory 33 written by the EtherCAT slave controller 32, said EtherCAT memory being the interface between the EtherCAT slave controller 32 and the microcontroller 31. From the EtherCAT memory 33, the FSoE message is transferred by the single-channel software module EtherCAT slave functions 311 to the FSoE memory 312, which forms the interface to the dual-channel software module safety functions 4.

The black channel extends up to the dual-channel software module safety functions 4, the dual-channel safety module safety functions 4 detecting changes to the FSoE message. The dual-channel software module safety functions 4 converts the FSoE message into a safety message and stores the safety message in the safety memory 614, which forms the interface between the dual-channel software module safety functions 4 and the single-channel software module standard functions 613. The single-channel software module standard functions 613 reads out the safety message from the safety memory 614 and then sends the safety message to the hardware station.

Conversely, a safety message sent by the hardware station is received by the single-channel software module standard functions 613 and copied to the safety memory 614, which forms the interface to the dual-channel software module safety functions 4. The black channel extends up to this point, the dual-channel safety module safety functions 4 detecting changes to the safety message.

The dual-channel software module safety functions 4 converts the safety message into an FSoE message and stores the FSoE message in the FSoE memory 312, which forms the interface between the dual-channel software module safety functions 4 and the single-channel software module EtherCAT slave functions 311. The single-channel software module EtherCAT slave functions 311 copies the FSoE message from the FSoE memory 312 into the EtherCAT memory 33, which forms the interface between EtherCAT slave controller 32 and the single-channel software module EtherCAT slave functions 311.

When an EtherCAT data packet is received by the EtherCAT slave controller 32 to read the EtherCAT memory 33 of the EtherCAT/hardware gateway 301, the FSoE message is inserted into the EtherCAT data packet by the EtherCAT slave controller 32 on the fly.

The software module operational function module 315 provided on the microprocessor 31 ensures that the dual-channel software module safety functions 4, the single-channel software module standard functions 613 and the single-channel module EtherCAT slave functions 311 are addressed cyclically.

The EtherCAT/hardware gateway 301 is shown as EtherCAT slave subscriber. However, the safety gateway could also be a subscriber of another field-bus system, since the FSoE protocol is not restricted to transmission on the EtherCAT field bus.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A protocol converter for converting safety-relevant messages between a first network and a second network,
    wherein the first and second networks use different network protocols for message exchange,
    wherein the first network comprises at least one first subscriber having a first safety communication layer which processes a first safety communication protocol, and
    wherein the second network comprises at least one second subscriber having a second safety communication layer which processes a second safety communication protocol;
    the protocol converter comprising a single-channel interface which allowing for message exchange with the first network and/or with the second network,
    a single-channel filter connected to the interface for determining messages with the first safety communication protocol and messages with the second safety communication protocol from messages received by the interface, and
    an at least dual-channel safety module connected to the single-channel filter for converting messages with the first safety communication protocol detected by the filter into messages with the second safety communication protocol and for converting messages with the second safety communication protocol detected by the single-channel filter into messages with the first safety communication protocol, respectively.

2. The protocol converter according to claim 1, wherein the safety module comprises at least two parallel software function channels.

3. The protocol converter according to claim 1,
    wherein said single-channel interface comprises a single-channel first interface allowing for message exchange with said first network comprising said at least one first subscriber with said first safety communication layer processing said first safety communication protocol, and a single-channel second interface enabling message exchange with said second network comprising said at least one second subscriber with said second safety communication layer processing said second safety communication protocol,
    wherein said single-channel filter comprises a single-channel first filter to determine messages with said first safety communication protocol from messages received from said first interface, and a single-channel second filter to determine messages with said second safety communication protocol from messages received from said second interface, and
    wherein the at least dual-channel safety module is connected to the single-channel first and second filters to convert messages with the first safety communication protocol detected by the single-channel first filter into messages with the second safety communication protocol and to convert messages with the second safety communication protocol detected by the single-channel second filter into messages with the first safety communication protocol, respectively.

4. The protocol converter according to claim 3, wherein the first and/or second interface comprises a bus controller for a field bus, a serial interface for a point-to-point connection or a dual-port RAM memory for a data bus.

5. The protocol converter according to claim 3, wherein the first and/or second filter comprises further non-safety-relevant functions.

6. The protocol converter according to claim 1, wherein the safety module comprises further safety-relevant functions.

7. The protocol converter according to claim 1, comprising a single channel operational function module connected to the single-channel filter and the safety module in order to cyclically invoke the single-channel filter and the safety module.

8. An automation system comprising a first network and a second network using different network protocols,
    wherein the first network comprises at least one first subscriber having a first safety communication layer processing a first safety communication protocol,
    wherein the second network comprises at least one second subscriber having a second safety communication layer processing a second safety communication protocol, and
    wherein between the first network and the second network a protocol converter for converting safety-relevant messages between a first network and a second network is provided;

the protocol converter comprising:
a single-channel interface which allowing for message exchange with the first network and/or with the second network,
a single-channel filter connected to the interface for determining messages with the first safety communication protocol and messages with the second safety communication protocol from messages received by the interface device, and
an at least dual-channel safety module connected to the single-channel filter for converting messages with the first safety communication protocol detected by the filter into messages with the second safety communication protocol and for converting messages with the second safety communication protocol detected by the single-channel filter into messages with the first safety communication protocol, respectively.

9. The automation system according to claim 8, wherein the safety module comprises at least two parallel software function channels.

10. The automation system according to claim 8,
wherein said single-channel interface comprises a single-channel first interface allowing for message exchange with said first network comprising said at least one first subscriber with said first safety communication layer processing said first safety communication protocol, and a single-channel second interface enabling message exchange with said second network comprising said at least one second subscriber with said second safety communication layer processing said second safety communication protocol,
wherein said single-channel filter comprises a single-channel first filter to determine messages with said first safety communication protocol from messages received from said single-channel first interface, and a single-channel second filter to determine messages with said second safety communication protocol from messages received from said second interface, and
wherein the at least dual-channel safety module is connected to the single-channel first and second filters to convert messages with the first safety communication protocol detected by the single-channel first filter into messages with the second safety communication protocol and to convert messages with the second safety communication protocol detected by the single-channel second filter into messages with the first safety communication protocol, respectively.

11. The automation system according to claim 10, wherein the first and/or second interface comprises a bus controller for a field bus, a serial interface for a point-to-point connection or a dual-port RAM memory for a data bus.

12. The automation system according to claim 10, wherein the single-channel first and/or second filter comprises further non-safety-relevant functions.

13. The automation system according to claim 8, wherein the safety module comprises further safety-relevant functions.

14. The automation system according to claim 8, comprising a single channel operational function module connected to the single-channel filter and the safety module in order to cyclically invoke the filter and the safety module.

15. A protocol converter for converting safety-related messages between a first network and a second network, comprising:
a single-channel interface that allows for message exchange with a network,
a single-channel filter connected to the interface determines messages having a first safety communication protocol and messages having a second safety communication protocol from messages received by the interface device, and
a dual-channel safety module connected to the single-channel filter and converting the messages with the first safety communication protocol determined by the single-channel filter into messages with a second safety communication protocol, and converting the messages with the second safety communication protocol determined by the single-channel filter into messages with the first safety communication protocol.

16. The protocol converter according to claim 15, wherein the safety module comprises at least two parallel software function channels.

17. The protocol converter according to claim 1,
wherein said single-channel interface comprises a single-channel first interface allowing for message exchange with a first network comprising at least one first subscriber with a first safety communication layer processing said first safety communication protocol, and a single-channel second interface enabling message exchange with a second network comprising at least one second subscriber with a second safety communication layer processing said second safety communication protocol,
wherein said single-channel filter comprises a single-channel first filter to determine messages with said first safety communication protocol from messages received from said first interface, and a single-channel second filter to determine messages with said second safety communication protocol from messages received from said second interface, and
wherein the at least dual-channel safety module is connected to the single-channel first and second filters to convert messages with the first safety communication protocol detected by the single-channel first filter into messages with the second safety communication protocol and to convert messages with the second safety communication protocol detected by the single-channel second filter into messages with the first safety communication protocol, respectively.

18. The protocol converter according to claim 17, wherein the safety module comprises further safety-relevant functions.

19. The protocol converter according to claim 17, comprising a single channel operational function module connected to the single-channel filter and the safety module in order to cyclically invoke the filter and the safety module.

* * * * *